May 19, 1970     H. RIEPE     3,512,897

WEIGHT WITH CLEANSING WIRE FOR TUBULAR PENS

Filed Jan. 8, 1969     2 Sheets-Sheet 1

INVENTOR.
HELMUTH RIEPE
BY
ATTORNEY

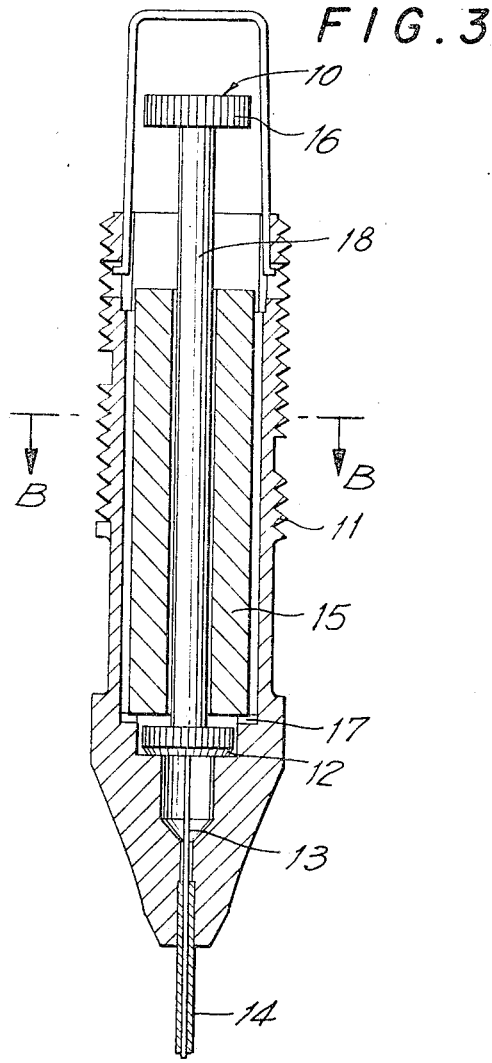
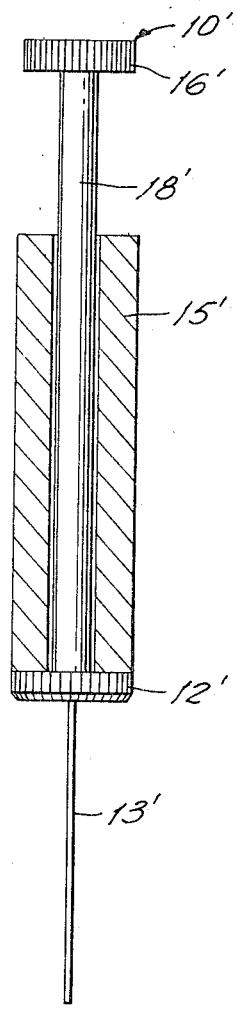
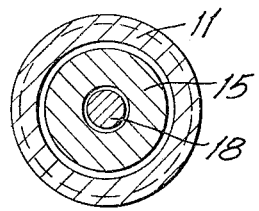
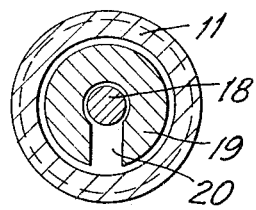
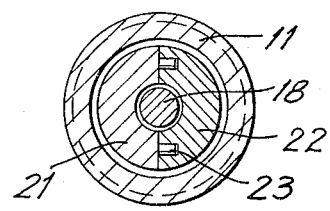

United States Patent Office 3,512,897
Patented May 19, 1970

3,512,897
WEIGHT WITH CLEANSING WIRE FOR
TUBULAR PENS
Helmuth Riepe, Hamburg, Germany, assignor, by mesne
assignments, to Radiograph, Inc., Bloomsbury, N.J.,
a corporation of New Jersey
Filed Jan. 8, 1969, Ser. No. 789,753
Claims priority, application Germany, Jan. 11, 1968,
R 47,770
Int. Cl. B43k 1/06
U.S. Cl. 401—259                                    15 Claims

ABSTRACT OF THE DISCLOSURE

The present invention pertains to an improved tubular writing pen having a floating weight and a cleansing wire attached to the weight, wherein the improvement resides in the provision of an additional weight in conjunction with said floating weight to form a unit which by means of a shaking action causes movement of said cleansing wire between two positions independent of the position of the cleansing wire, to thereby permit said cleansing wire to be freed even from its dried-in lowermost position within the tubular pen.

BACKGROUND OF THE INVENTION

Tubular pens which are provided with a cleansing wire in order to improve the capillary flow of ink, as well as to remove dried-in ink residue by shaking the cleansing wire to-and-fro, are well known. The motion of the cleansing wire can be effected either manually against the action of a spring or by shaking a weight connected to the cleansing wire. In order to permit movement of the cleansing wire, even in the case of hard dried-in ink residues, the floating weight of the pen was made relatively large. However, the relatively large floating weight has the disadvantage that less ink storage space is provided and there is more surface area upon which ink residue may settle, thereby preventing movement of the cleansing wire. Moreover, it has been suggested that in order to save space the metal floating weight be fabricated as a cylindrical plastic body having a lead weight attached thereto, whereby the diameter of the plastic body will permit only a close clearance in the bore of the pen holder. At the same time, the diameter of the lead weight will be considerably smaller than the hole in the locking cap so that the floating weight will be correspondingly offset, thus permitting the weight to move freely inside the bore of the pen casing. This suggestion, however, does not provide any improved movement of the cleaning wire.

A further suggestion, aimed at an increased slinging effect during the shaking to-and-fro, consists in providing, besides the floating weight, an additional weight which can be moved in relation to the former. One example of this type of construction is a ball-shaped floating weight which is positioned loosely on the cleansing wire holder. The floating weight is then pressed downwardly by an additional weight, whereby during the shaking action the cleansing wire is subjected to an increased force due to the impact of the floating weight and the additional weight. In another form of construction, there is provided an additional loose weight which hits the floating weight connected to the cleansing wire during the shaking action thereof.

All of these arrangements have the disadvantage that only the downward movement is increased during the shaking action so that a cleansing wire dried-in in its lowest position cannot be moved upward out of this position by the shaking action. Another disadvantage is the fact that the additional weights are floating loosely within the ink space so that the additional weights may also become fixed to the ink chamber wall by dried-in ink residue or may adhere to the floating weight. Furthermore, both the floating weight and the additional weights must either be stainless steel or nickel-plated, in either case the weights must be machined with extreme precision so as to prevent jamming. A further disadvantage of these known floating weights lies in the fact that the total weight of both weight bodies press the cleansing wire downwardly out from the tubular pen, which in the case of modern drawing foils with fillers have a strong abrasive effect thereon, thereby resulting in rapid wear of the cleansing wire tips which are pressed against the drawing surfaces at too great a pressure.

SUMMARY OF THE INVENTION

It is the primary object of the present invention to eliminate the aforementioned disadvantages by providing a tubular pen having a floating weight with cleansing wire, wherein the floating weight is fabricated in a manner such that during the shaking action thereof the floating weight with the cleansing wire press upward and outwardly from their lowest position in which they are sticking, whereby any additionally included weights do not come in contact with the ink and thus no longer have to be manufactured from highly expensive corrosion-resistant materials or have to be made corrosion-resistant by nickel plating.

It is another object of the present invention to provide a tubular pen having a weight with cleansing wire wherein there is provided an additional weight whereby during the writing process the extra heavy load produced by the additional weight does not affect the cleansing wire tip to cause heavy wear thereof, as in prior art devices.

It is a further object of the present invention to provide a tubular pen having a weight with cleansing wire which is especially suited for use in automatic drawing machines wherein the to-and-fro motion intended for cleaning is unaffected by shaking action, whereby the same has been virtually impossible to achieve in automatic drawing machines prior to the present invention.

The present invention contemplates solving the prior art problems by providing a floating weight with cleansing wire for tubular pens having an additional weight therein which is movable relative to the floating weight. The invention is characterized by the fact that the floating weight and the additional weight are connected to form a unit wherein the additional weight can move freely between a lower position disposed above the place of attachment of the cleansing wire and an upper position disposed just below the upper end of the floating weight.

In one embodiment of the invention, the floating weight and the additional weight, when both are in their lowest position, do not have their exterior surfaces in contact with one another.

This structural configuration makes it possible to use the tubular pen for freeing the cleansing wire being held in situ by dried-in ink residue, independent of the fact that the cleansing wire is held in its lowest, highest or intermediate position. If, in addition, the floating weight and the additional weight are prevented from touching each other when in their lowest positions, then the additional weight cannot press the cleansing wire against the writing surface with an extra force.

In a preferred embodiment of the invention the floating weight is fabricated as a hollow body inside of which there is positioned the additional weight which comprises one or several movable and preferably ball-shaped bodies. The additional weight, may also be formed as a cylindrical body. It is appropriate to manufacture the hollow floating weight body from a tubular plastic material, whereby the cleansing wire is attached to the lower end of the sleeve produced in the aforesaid manner. The upper end of the sleeve is sealed by a plate which is either welded, threaded or secured thereto in some other similar but equally suitable manner.

In this embodiment of the invention, the additional weight may be formed from any material and does not have to be manufactured from corrosion-resistant material, since ink is not present in the hollow sleeve.

In another embodiment of the invention, the floating weight body is constructed in the form of a rod on which a cylindrical, or partially cylindrical, additional weight of limited movability is disposed. In particular, the additional weight comprises two or more interlocking partial cylinders or cylindrical shells. The upper and lower ends of the rod are thus preferably provided with projections or thickened members which limit the to-and-fro motion of the additional weight. The additional weight can be prevented from hitting the floating weight in their lowest positions by means of a stop, whereby the stop may comprise an annular shoulder or corresponding projections in the tubular pen chamber where both the floating and the additional weights are placed. For this purpose, the additional weight is formed having a diameter larger than that of the upper part of the floating weight. However, other types of stop means may be employed equally as well.

In order to employ tubular pens with floating weights on drawing machines, the invention contemplates fabricating the additional weight as a soft iron core movable by means of a magnetic field. It is also possible, of course, to make a part of the additional weight or the floating weight as a permanent magnet. Such an arrangement will permit the cleaning of the cleansing wire tips used in drawing machines by means of an electrical signal which activates a to-and-fro motion of the cleansing wire. This will be a special significance in the case of the drawing machines wherein several tubular pen points which produce different thicknesses and colors are employed only sporadically during long periods of time.

BRIEF DESCRIPTION OF THE DRAWINGS

The foregoing and other objects, features and advantages of the present invention will become more apparent from the following detailed description considered in conjunction with the accompanying drawings wherein:

FIG. 3 is a sectional view similar to FIG. 1 of a floating weight with an additional weight which is movable to-and-fro on a rod and which depicts a third embodiment of the present invention;

FIG. 3a shows a horizontal sectional view taken along the line B—B of the tubular pen shown in FIG. 3;

FIG. 4 depicts a floating weight with additional weight similar to FIG. 3 in a simplified form; and FIGS. 5a and 5b are two sectional views similar to FIG. 3a of floating weights of various fabrication representative of two additional embodiments of the invention.

DESCRIPTION OF THE PREFERRED EMBODIMENTS

Figure 2:
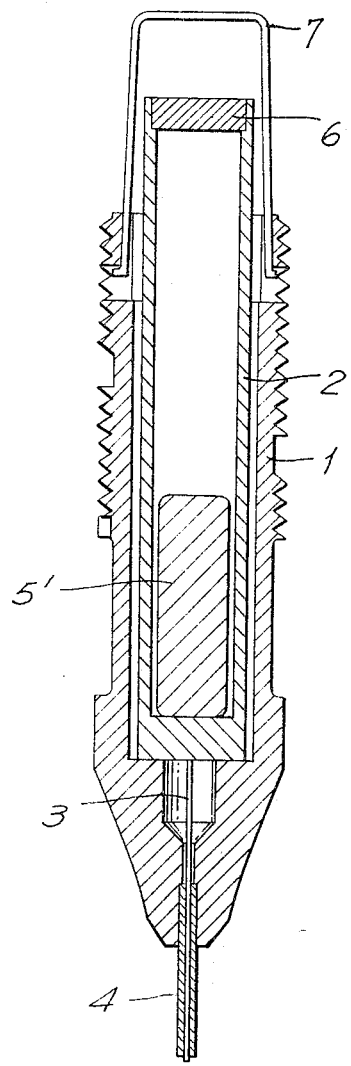
FIG. 2 is a sectional view similar to FIG. 1 depicting a second embodiment of the present invention.
Figure 1:
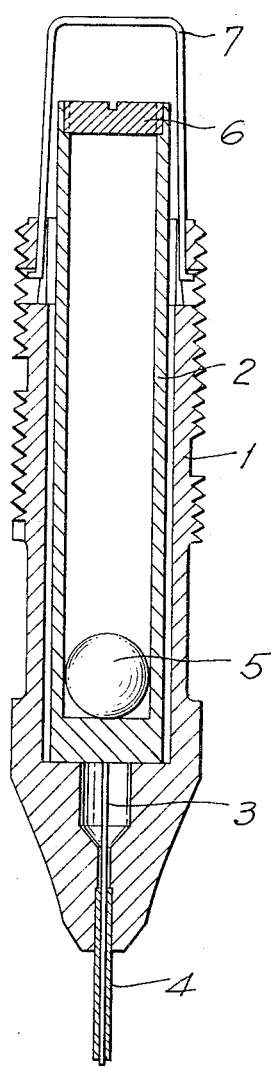
FIG. 1 is a sectional view of a tubular pen having a weight with cleansing wire and constructed in accordance with a first embodiment of the invention.

The tubular pen tip 1 as shown in FIGS. 1 and 3 includes a floating weight 2 which at its lower end is connected to a cleansing wire 3. The cleansing wire 3 extends through the pen 4 and is longitudinally movable therewithin. Referring now specifically to FIGS. 1 and 2, the floating weight 2 is shaped in the form of a sleeve inside of which an additional weight shaped either in the form of a ball 5 or a cylindrical body 5' can be moved to-and-fro. The additional weight 5 or 5', respectively, together with the floating weight 2 form a unit. The sleeve 2 is sealed at its upper end by means of a cover member 6, which may be secured thereto in any suitable manner such as by threaded or welded engagement.

In the case of the to-and-fro shaking action, the additional weight 5 or 5' hits both the bottom surface of the floating weight 2 and the surface of the cover 6 so that movement of the cleansing wire 3 is reinforced by the impact of the additional weight, both in the upward and downward movement of the wire.

In the embodiment of the invention depicted in FIGS. 3 and 3a, the floating weight 10 comprises a lower portion 12 having a cleansing wire 13 attached thereto, wherein the cleansing wire 13 can be moved longitudinally to-and-fro inside the tubular pen 14. In addition, the floating weight 10 also includes a rod 18 having an upper disk 16 secured thereto. An additional weight 15 constructed in the form of a cylindrical sleeve is disposed about the rod 18 with the to-and-fro movement of the weight 15 being limited by the lower portion 12 and upper disc 16 of the floating weight 10. In this embodiment, the floating weight 10 and the additional weight 15 also form a unit. Thus, as a result of the shaking action, the additional weight 15 is forced against the upper disk 16 during the upward movement thereof, as viewed in the drawings, or is forced against the lower portion 12 of the floating weight 10 during the downward movement thereof. Thus, since the upper disk 16 and lower portion 12 are connected to each other by means of the rod 18, there is longitudinal movement of the cleansing wire 13 from any position thereof.

The floating weight can also be fabricated in accordance with the embodiment of the invention depicted in FIG. 4, wherein the additional weight 15' is again movable to-and-fro upon a rod 18'. This movement is limited at the top by the cover 16' and at the bottom by the lower portion 12' having the cleansing wire 13' secured thereto. In this embodiment, the additional weight 15' and both the limiting parts 16' and 12' are all of the same diameter. In the embodiment shown in FIG. 3, the diameter of the additional weight 15 is larger than that of the bottom portion 12 of the floating weight 10. Thus, the additional weight 15, due to a corresponding shoulder 17 formed in the tubular pen tip 11, does not press on the lower portion 12 of floating weight 10 when the latter is in its lowest position. As a result, the tip of the cleansing wire is not subjected to any unnecessary pressures. The shoulder 17, in order to meet the demands for a required ink flow, may be formed as an annular through shoulder, since there is enough space between the rod 18 and the additional weight 15 for the ink to pass through. It is also possible, of course, to provide simple shoulder projections having openings for the passage of ink.

Additional weights of a partially cylindrical or any other shape can also be provided instead of the cylindrical additional weights and such are shown in FIGS. 5a and 5b.

FIG. 5a shows a partially cylindrical additional weight 19 having a recess 20 which serves to mount the additional weight and also serves to aid the ink flow. This is especially true in the case where the stop is in the shape of an annular shoulder. The slot 20 is preferably somewhat wider at the center thereof so as to make it possible to snap the floating weight upon the rod 18.

FIG. 5b shows two cylindrical shell-shaped additional weights 21 and 22, respectively, which during assembly thereof are connected by means of locking devices 23 of the type which are well known in the art.

While I have shown and described several preferred embodiments of the invention, there are many modifications, changes and improvements which may be made therein without departing from the spirit and scope of the invention as described in the appended claims.

What is claimed is:

1. In a tubular writing pen having a floating weight with a cleansing wire attached thereto, the improvement comprising an additional weight movable relative to said floating weight and connected therewith to form a unit, said additional weight being freely movable between a lower position disposed above the place of attachment of said cleansing wire to said floating weight and an upper position below the upper end of said floating weight.

2. A tubular writing pen in accordance with claim 1, wherein said lower position is disposed immediately above said place of attachment, and said upper position is disposed immediately below said upper end of said floating weight.

3. A tubular writing pen in accordance with claim 1, wherein said floating weight and said additional weight are in their lowermost positions the adjacent surfaces thereof are spaced apart and separate from one another.

4. A tubular writing pen in accordance with claim 1, wherein said floating weight is of a hollow configuration, said additional weight is disposed within said floating weight and comprises at least one member moveable therewithin.

5. A tubular writing pen in accordance with claim 4, wherein said moveable member has a substantially ball-shaped configuration.

6. A tubular writing pen in accordance with claim 4, wherein said moveable member has a substantially cylindrical configuration.

7. A tubular writing pen in accordance with claim 4, wherein said hollow floating weight has a substantially cylindrical configuration forming a sleeve, said cleansing wire being attached to the lower end of said sleeve, and said upper end of said sleeve being sealed by a cover plate secured thereto.

8. A tubular writing pen in accordance with claim 7, wherein said sleeve is fabricated from a plastic material.

9. A tubular writing pen in accordance with claim 1, wherein said floating weight comprises a rod, said additional weight comprising at least a partial cylindrical member, and said additional weight being disposed about said rod and having limited movement with respect thereto.

10. A tubular writing pen in accordance with claim 9, wherein said additional weight comprises at least two partial cylindrical shell members, means for interconnecting said members.

11. A tubular writing pen in accordance with claim 1, wherein said rod has upper and lower ends, means connected to said upper and lower ends to limit the to-and-fro movement of said additional weight therebetween.

12. A tubular writing pen in accordance with claim 1, wherein said additional weight is fabricated from a magnetic material and is moveable by means of a magnetic field.

13. A tubular writing pen in accordance with claim 12, wherein said magnetic material is a soft iron core.

14. A tubular writing pen in accordance with claim 1, wherein said tubular pen includes a tubular chamber having stop means therein to prevent said additional weight from contacting said floating weight when the latter is in its lowermost position.

15. A tubular writing pen in accordance with claim 14, wherein said stop means comprises an annular shoulder formed in said tubular pen chamber and said additional weight and said floating weight being disposed within said chamber.

References Cited

UNITED STATES PATENTS

| | | | |
|---|---|---|---|
| 291,925 | 1/1884 | Morton | 401—259 |
| 3,420,611 | 1/1969 | Towns | 401—115 |
| 3,455,639 | 7/1969 | Danjczck | 401—259 |

FOREIGN PATENTS

| | | |
|---|---|---|
| 663,362 | 5/1963 | Canada. |
| 869,699 | 6/1961 | Great Britain. |
| 450,959 | 5/1968 | Switzerland. |

LAWRENCE CHARLES, Primary Examiner